Dec. 10, 1968  D. D. GALBRAITH  3,415,013
INTERLOCKING-TYPE BORDER BUILDING UNIT
Filed Nov. 2, 1966  2 Sheets-Sheet 1
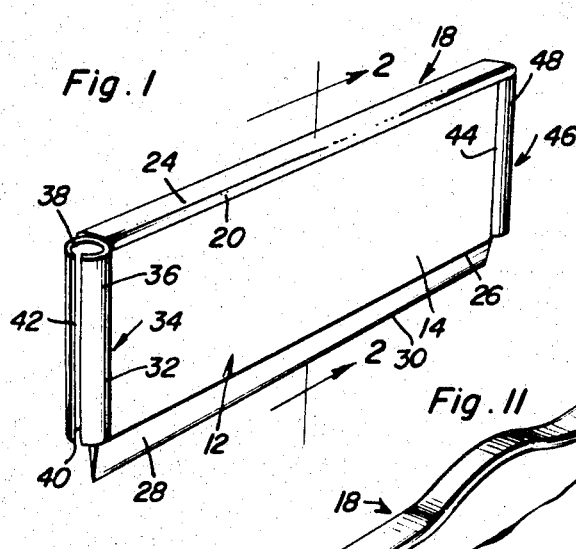
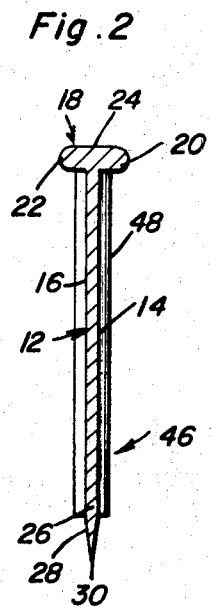
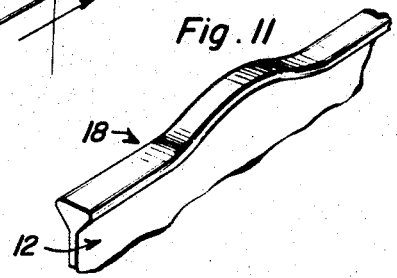
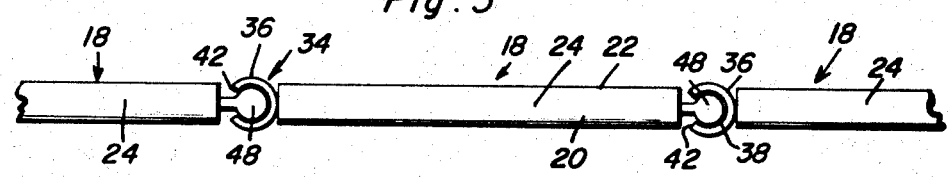
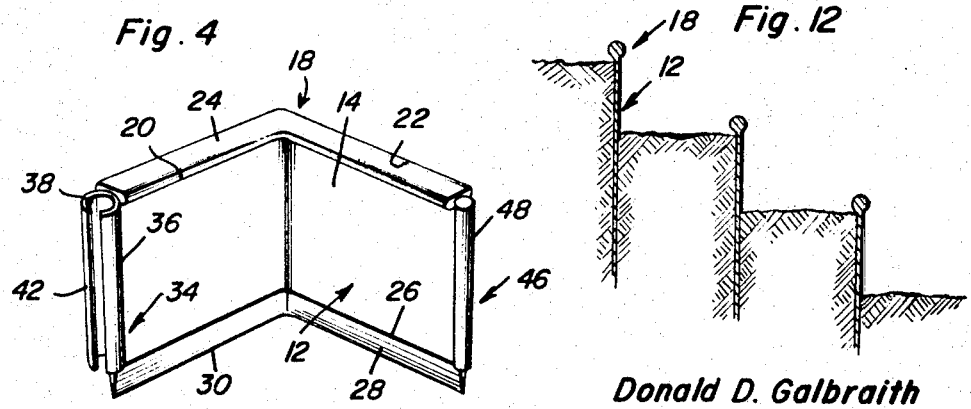
Donald D. Galbraith
INVENTOR.

Dec. 10, 1968          D. D. GALBRAITH          3,415,013
             INTERLOCKING-TYPE BORDER BUILDING UNIT
Filed Nov. 2, 1966                              2 Sheets-Sheet 2
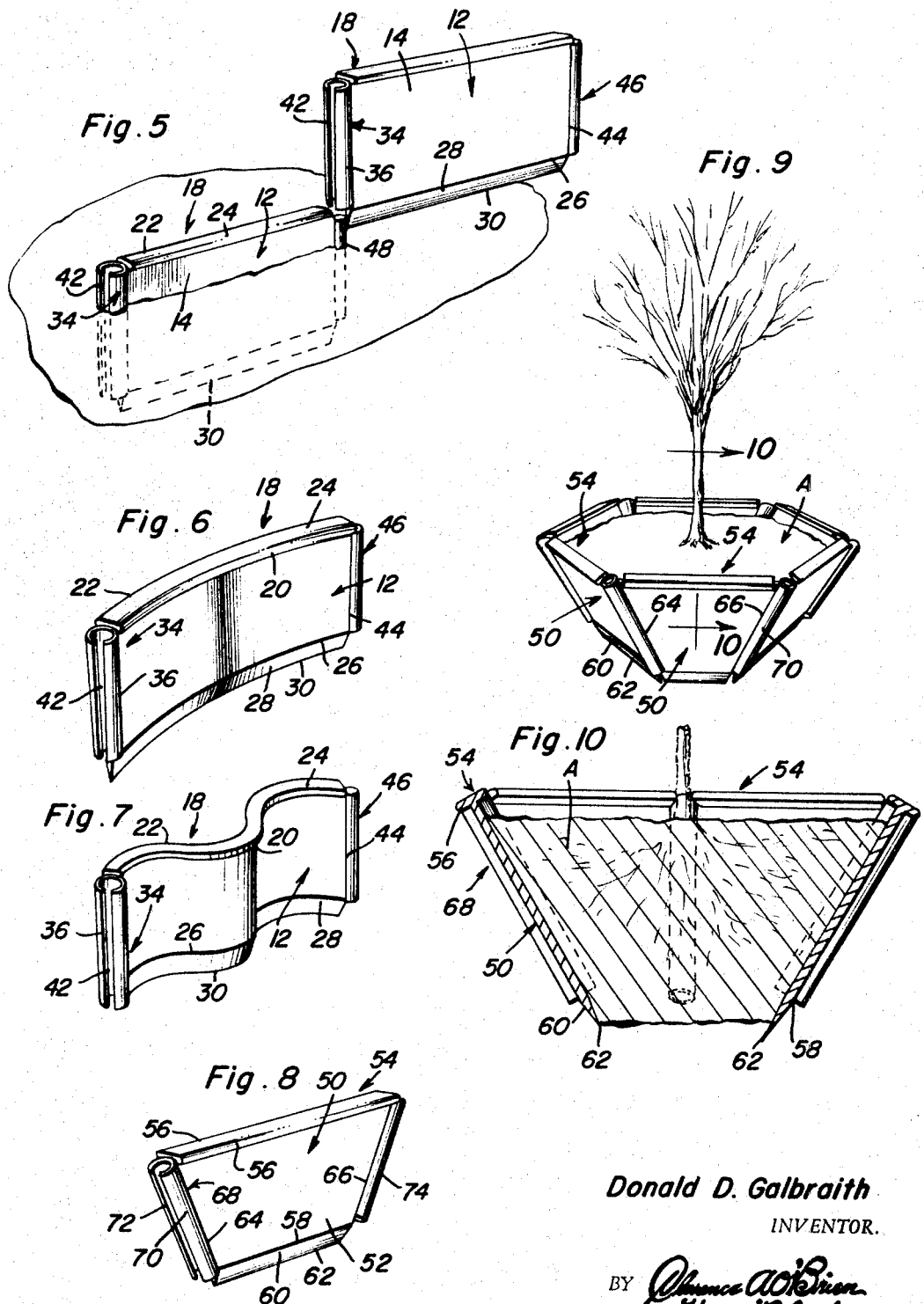
Donald D. Galbraith
INVENTOR.

United States Patent Office 3,415,013
Patented Dec. 10, 1968

3,415,013
INTERLOCKING-TYPE BORDER
BUILDING UNIT
Donald D. Galbraith, 1855 Cox Road,
Aptos, Calif. 95003
Filed Nov. 2, 1966, Ser. No. 591,525
3 Claims. (Cl. 47—37)

ABSTRACT OF THE DISCLOSURE

Releasably interconnectible ground penetrating units configured so as to join in the formation of an area defining border. Each of the units includes a pair of opposed substantially vertical edges, one of which is provided with a substantially full height split sleeve and the other of which is provided with a substantially full length rib receivable in the sleeve of an adjacent unit for releasable interconnection therewith. The opposed edges may converge downwardly toward each other whereby, upon the releasable interlocking of a plurality of units, a container-like configuration is defined for forming and confining balls of soil in transplanting operations.

---

This invention relates to a new and improved easy-to-assemble structure wrich is expressly designed and adapted for lawn and garden use and which lends itself to practical time and labor saving use when the user desires to lay out and construct a garden isolating and delineating border, a tree-base encircling collar or frame, a separating and dividing wall between oriented lawn and flower bed areas, edging means between the margins of a lawn and coacting walkway, or for similar plot marking and outdoor landscaping purposes.

To be sure, flower bed borders of portable sectional construction, edgers and dividers of many and varied styles and forms, and area enclosures and delineating walls have been devised by others for on-the-spot erection and use. It is common practice to employ prefabricated quick-connectible and separable components. For example, one prior art garden fencing frame, broadly similar to the herein disclosed adaptation, is shown in the knockdown precast concrete structure patented under No. 1,851,710 by Lefevre and a somewhat more pertinent collapsible transplanting wall is shown, by way of example, in Patent No. 2,859,558, issued to Hallum.

An objective in the instant matter is to improve upon the above and any analogous dividers and bordering frames and enclosures. One improvement has to do with novel individual units wherein each unit is charcaterized by a panel-like plate. This plate is of predetermined shape and over-all appearance and may be flat and rectangular, curvate or longitudinally bowed, serpentine in contour, right-angular and corner-like in form, or, and this is significant, may be and frequently is trapezoidal for soil entrapping and plant transplanting needs.

More specifically the essence of the concept has to do with a panel-like plate characterized by horizontal top and bottom marginal edges and vertical terminal ends, said vertical ends each having a substantially vertically disposed plate assembling and jointing member integral therewith, said jointing members permitting connectible right and left ends, respectively, of a series of said units to be positioned end-to-end, interlocked, and separably linked together to define and provide a border, divider, wall-like enclosure, or the like, the jointing members for each unit being of an overall length less than the vertical height of said unit and the top and bottom ends of said members terminating short of the top and bottom marginal edges of said plate.

As previously pointed out, it is old in the art to provide a sectional wall-like enclosure or frame wherein the sections or units are arranged end to end or in variable angular relationship and to separably interlock the ends of the units which are readily connectible and subsequently disconnectible for replacement, dismantling or whatever purpose desired. In carrying out the present invention, novelty is predicated in part on the improvement above-identified and, more explicitly wherein one jointing member, let us say the one at the left end, comprises an integral sleeve which is open at upper and lower ends and has the longitudinal surface split lengthwise with the split lined up with the plane of the inward and outward vertical surfaces of the plate so as to thus provide a female coupling member or sleeve. Then, too, novelty is predicated on the complemental jointing member at the right hand end of the plate which comprises an integral tongue-like rib which is conformable in shape and size to the socket-like receiver portion of the sleeve and constitutes and provides a male assembling, interlocking and coupling tongue.

Further novelty has to do with the plate means which can be rectangular in outline, longitudinally curved according to the degree of arcuity desired, which can, if desired, be corrugated or serpentine in over-all appearance. In addition, it is within the purview of the concept to provide a plate wherein the transverse of vertical end portions converge toward the bottom edge so as to in this manner provide a plate which is trapezoidal in shape and appearance.

As will also be hereinafter more clearly evident this invention pertains to a prefabricated ready-to-erect wall and border building unit. This unit is characterized by a rigid, flat-faced, panel-like plate. The plate has a horizontal lengthwise top marginal edge and a spaced parallel bottom marginal edge. To the ends desired the top edge is provided with an enlarged rib-like flange which provides a plate driving and sinking head. The bottom edge is fashioned into a ground-penetrating blade. The left hand vertical end of the plate has a vertical split open-ended sleeve of the type already described whereas the right hand end is provided with a conformable rigid rib which provides a male coupling member which is adapted to be interlocked with the sleeve.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of an interlocking type border building unit constructed in accordance with the principles of the present invention.

FIG. 2 is an enlarged section taken on the plane of the section line 2—2 of FIG. 1.

FIG. 3 is a top plan view showing one complete unit and fragmentary portions of left and right units cooperatively associated therewith to bring out the interlocking and jointing aspect of the invention.

FIG. 4 is a view in perspective of a unit which is structurally like that shown in FIG. 1 but which is a modification in that it is of right angular shape and constitutes a corner-type border building unit.

FIG. 5 is a view in perspective showing two of the units constructed in accordance with FIG. 1 and with the unit at the left embedded and the one at the right in an elevated ready-to-assemble position.

FIG. 6 is a view in perspective showing a modified unit wherein the plate portion is curvilineal.

FIG. 7 is a view in perspective showing the serpentine-shaped unit.

FIG. 8 is a view in perspective showing the aforementioned trapezoidal unit.

FIG. 9 is a view also in perspective showing the manner in which six of the trapezoidal units are linked together to provide a soil encompassing frame for transplanting or other useful purposes.

FIG. 10 is a view on an enlarged scale taken approximately on the plane of the section line 10—10 of FIG. 9.

FIG. 11 is a view of a modified top edge.

FIG. 12 is a view of an elongated form of the unit used in terracing.

As will be evident, it is submitted, from the information so far given and particularly from the views of the drawings and whereas novelty could perhaps be predicated on a knock-down border, frame or enclosure similar for example to that shown in FIGS. 9, and 10, the invention resides, primarily stated, in, as the title implies, an interlocking-type border, wall or frame building unit. Moreover, and except for FIGS. 8, 9, 10 and 12, the illustrative views of the drawings are directed to border building units characterized generically and specifically and therefore in keeping with the views herein shown and described. For convenience of description FIGS. 1, 2, 3, 4, 5, 6, 7 and 11 are basically the same except as to general appearance or over-all shape. This is to say, the embodiment of the unit appearing in FIGS. 1 to 3, inclusive, and FIG. 5 is of the same construction. The details are much the same in FIGS. 6 and 7 and the principal difference is that FIG. 6 differs merely in that it is longitudinally bowed or curvate in appearance. FIG. 7 is broadly the same except that it is the form of a compound curve and therefore regarded as serpentine in shape. FIGURE 11 differs in the use of a typical other-than-horizontal upper edge for decorative purposes. FIG. 4 shows a typical angular or corner-type unit which may actually define any desired angle. All of these units comprise a body or plate portion which is denoted throughout the views by the numeral 12 and is characterized (FIG. 2) by an outer flat or planar surface 14 and an inner flat surface 16, both of which may have decorative indicia thereon. The upper or top marginal edge is provided with an elongated flange 18 which is integral with said top edge and has overhanging outer and inner edge portions 20 and 22 respectively. This flange, utilized as a driving head and also as a reinforcing ridge can be of any suitable transversely enlarged cross-section, as for example illustrated in FIGS. 11 and 12. In any event the top surface 24 will present a full length impact surface to assist one in using a mallet, perhaps even a hammer, in driving the bottom edge portion 26 into the ground or other surface as indicated at the left in FIG. 5. This bottom edge portion has beveled or chamfered surfaces 28 which transform the lower edge portion into a ground-penetrating, cleaving and anchoring blade 30 along the vertical center of the plate portion 12 to insure a straight driving of the unit.

The left hand end portion, FIG. 1 for example, is provided as at 32 with an integral female coupling member which is denoted generally at 34. This member comprises an open-ended sleeve, that is a sleeve 36 whose upper end is open at 38, the lower end open at 40 and with the length of the sleeve such that the lower end terminates above the cutting blade and the upper end just below the upper surface of the driving head or flange 18 in the manner shown so as to protect the upper end of the sleeve from damage during driving, while presenting a substantially smooth upper edge on the finished border. The sleeve is also provided with a slot or keyway 42 which opens through the open ends and which is in line with the plate or body portion. The transverse or vertical right hand end portion 44 is provided with a complemental or companion jointing member 46 which comprises a rib 48 and which is of a length and cross-section and shape to fit slidingly and removably into the socket or receptacle portion of the coupling sleeve 34 in the manner illustrated in particular in FIGS. 3 and 5. It is evident that the coupling members 34 and 46 are located outwardly of the terminal end portions of the driving head or flange 18 to facilitate joining the units together in the manner suggested in FIG. 5. The completely coupled or assembled state is illustrated in FIG. 3. FIG. 3 also emphasizes the significance and importance of the quick separable and connectable joint detail which achieves the interlocking joint effect desired. It follows therefore that each unit is characterized by a plate or body portion having a normally horizontal lengthwise top edge and a horizontal bottom marginal edge, said edges being generally parallel with each other. The top edge accordingly has an enlarged flange (providing a rail-like head or bead) and which has a generally flat surface providing a driving head. The bottom edge of each plate is fashioned into a ground-penetrating blade with the left hand vertical end of the plate provided with a vertically split open-ended sleeve forming a female coupling member, and the right hand end having a conformable rib providing a male coupling member.

It will be noted that in the forms or modifications described, the generic principle is the same in that the left and right hand ends are parallel to each other and at right angles to the upper and lower marginal edges. With reference now to FIG. 8 and wherein the basic details are the same as already described this modification is significantly different in minor but important details. For convenience this adaptation is shown in FIG. 8 where it is denoted by the numeral 50, the same comprising a panel or plate-like body portion 52 whose top edge is provided with a bead or flange 54 commensurate in length with said edge and having overhanging edge portions 56. Again, the lower longitudinal edge 58 is provided with beveled or chamfered surfaces 60 defining a penetrating and anchoring blade 62. Here instead of the transverse left and right ends being at right angles, the left hand end 64 is inclined inwardly and downwardly as is the opposite right hand end 66, both ends converging toward the blade. Accordingly, the blade is of a length shorter than the flanged head 54. Moreover the integral sleeve 68 inclines inwardly and downwardly as at 70 and is provided with a slot or keyway 72. The oblique-angled jointing member or rib 74 at the right in FIG. 8 is conformable with the receptacle portion of the sleeve 68. This is to say when coacting end portions of adjacent units are placed end to end, they are capable of being separably coupled as shown in FIG. 9 to provide a frame or enclosure, collar, border or the like which is capable of confining the ball of soil A for planting and transplanting purposes. It will of course be appreciated that the frame of FIG. 9 can be constructed at any desired angle through the utilization of different size units 50.

The significance of FIG. 12 resides in the illustration of units of increased height which are particularly adapted for terracing purposes, the units being in fact formable in any desired size depending upo the particular use to which they are to be put. The terracing units will normally have decorative indicia on the exposed faces.

It is submitted that the interlocking-type border building unit (or units) constructed in accordance with the invention is possessed of the evident features and advantages present in each unit and the cooperative features and advantages achieved when the units are assembled as in FIGS. 3, 9 and 10. A more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in constructing a sectional soil confining transplanting container, a plurality of independent units releasably interconnectible into a generally annular soil confining configuration tapering from an enlarged upper end portion to a reduced soil underlying lower end portion for defining and confining a ball of soil, each of said units having a generally flat body defined by a lower soil penetrating edge, an upper driving edge, and opposed connecting side edges, said side edges converging downwardly toward each other from the upper edge to the lower edge, each of said side edges including connecting means thereon for releasably interlocking each side edge to the side edge of an adjacent unit with the releasably locked edges in contact with each other along substantially the entire length thereof whereby an angular inclined relationship is formed between adjacent units which, upon the utilization of a specific number of releasably interconnected similar size units, will form a generally conical container.

2. The construction of claim 1 wherein one connecting side edge of each unit includes a substantially full length split sleeve open at the upper and lower ends thereof, and wherein the second connecting side edge of each unit comprises a sleeve receivable substantially full length rib selectively slidable into the sleeve of an adjacent unit for releasable retention thereby.

3. The construction of claim 2 wherein the upper driving edge is provided with a substantially full length enlarged flange having a flat lengthwise impact surface, the opposed edges of which overhang the opposed faces of the generally flat body, thereby forming an enlarged driving head along substantially the full length of the unit.

References Cited

UNITED STATES PATENTS

| | | | |
|---|---|---|---|
| 352,146 | 11/1886 | Oungst | 47—33 |
| 557,030 | 3/1896 | Schaefer | 47—33 |
| 2,062,410 | 12/1936 | Garcia | 47—30 |
| 2,877,600 | 3/1959 | Slate | 47—33 |
| 594,668 | 11/1897 | Wilkens | 47—37 |
| 3,319,988 | 5/1967 | Smith | 47—37 X |

ROBERT E. BAGWILL, *Primary Examiner.*

U.S. Cl. XR.

47—33